(12) United States Patent
Ristroph et al.

(10) Patent No.: US 10,455,158 B2
(45) Date of Patent: Oct. 22, 2019

(54) STABILIZED GIMBAL SYSTEM WITH UNLIMITED FIELD OF REGARD

(71) Applicant: IJK Controls LLC, Richardson, TX (US)

(72) Inventors: Gunnar G. Ristroph, Round Rock, TX (US); Jason M. Raycroft, Los Angeles, CA (US)

(73) Assignee: IJK Controls LLC

( * ) Notice: Subject to any disclaimer, the term of this patent is extended or adjusted under 35 U.S.C. 154(b) by 0 days.

(21) Appl. No.: 15/268,635

(22) Filed: Sep. 19, 2016

(65) Prior Publication Data

US 2018/0255247 A1 Sep. 6, 2018

Related U.S. Application Data

(60) Provisional application No. 62/219,807, filed on Sep. 17, 2015.

(51) Int. Cl.
| | |
|---|---|
| *H04N 5/232* | (2006.01) |
| *H04N 5/225* | (2006.01) |
| *G02B 27/64* | (2006.01) |

(52) U.S. Cl.
CPC ......... *H04N 5/23296* (2013.01); *G02B 27/64* (2013.01); *H04N 5/2253* (2013.01); *H04N 5/2254* (2013.01); *H04N 5/2259* (2013.01); *H04N 5/2328* (2013.01); *H04N 5/23258* (2013.01)

(58) Field of Classification Search
CPC ............. H04N 5/23296; H04N 5/2253; H04N 5/2254; H04N 5/2259; H04N 5/23258; H04N 5/2328; G02B 27/64
See application file for complete search history.

(56) References Cited

U.S. PATENT DOCUMENTS

| | | | | |
|---|---|---|---|---|
| 4,989,466 A | * | 2/1991 | Goodman | G01C 21/18 352/243 |
| 7,000,883 B2 | * | 2/2006 | Mercadal | F16M 11/10 248/660 |
| 9,094,605 B2 | * | 7/2015 | Chapman | B66F 11/048 |
| 2010/0079101 A1 | * | 4/2010 | Sidman | F16M 11/041 318/649 |
| 2011/0304736 A1 | * | 12/2011 | Evans | H04N 5/33 348/169 |
| 2016/0014309 A1 | * | 1/2016 | Ellison | G02B 27/644 248/550 |

FOREIGN PATENT DOCUMENTS

GB 2464147 * 4/2010

* cited by examiner

*Primary Examiner* — Luong T Nguyen
(74) *Attorney, Agent, or Firm* — Chia-Hsin Suen (57) ABSTRACT

The disclosed embodiments provide a system for controlling orientation of a payload. The system includes a gimbal structure with four or more axes. The system also includes a control system that controls the gimbal structure to provide unrestricted orientation and rotational motion of the payload mounted to an axis in the four or more axes, independently of an orientation of a base of the gimbal structure.

19 Claims, 11 Drawing Sheets

STABILIZED GIMBAL SYSTEM WITH UNLIMITED FIELD OF REGARD

RELATED APPLICATION

This application hereby claims priority under 35 U.S.C. § 119 to U.S. Provisional Application No. 62/219,807, entitled "Stabilized Gimbal System with Unlimited Field of Regard," by inventors Gunnar G. Ristroph and Jason M. Raycroft, filed 17 Sep. 2015.

BACKGROUND

Field

The disclosure relates to gimbal systems. More specifically, the disclosure relates to stabilized gimbal systems with unlimited fields of regard.

Related Art

In general, the goal of a gimbal system is to control the orientation of a payload such as a camera, antenna, simulation object, or sensor. Many gimbals control only the pointing of a payload, but cannot arbitrarily control the payload's orientation. Cameras, for example, may be pointed by a gimbal system even when the gimbal system cannot control the orientation of the camera about the camera axis. By augmenting gimbal systems with sensors and control schemes, a gimbal can be made to stabilize a payload in inertial space. Further, the pointing and orientation of a payload can be commanded and controlled in inertial space.

Gimbal systems have limitations in their ability to orient payloads. One limitation can come from mechanical limits to the extent of travel as part of the gimbal structure interferes with itself in certain orientations. Another limitation occurs when the payload interferes with the gimbal structure or the payload's line-of-sight is obscured by the gimbal structure. Another limitation occurs when the wires or cables connecting different axes wrap up and do not allow the gimbal to rotate further. Yet another limitation to gimbal system performance occurs when one axis of a gimbal rotates in a way that causes another axis to lose its ability to effect payload orientation or stability, resulting in a loss of control authority known as "gimbal lock."

BRIEF DESCRIPTION OF THE DRAWINGS

In the figures, like elements are denoted by like reference numerals.

DETAILED DESCRIPTION

In the following detailed description, numerous specific details are set forth to provide a thorough understanding of the disclosed embodiments. However, it will be apparent to those skilled in the art that the disclosed embodiments may be practiced without these specific details. In other instances, well-known features have not been described in detail to avoid unnecessarily complicating the description.

Methods, structures, apparatuses, modules, and/or other components described herein may be enabled and operated using hardware circuitry, including but not limited to transistors, operational amplifiers, logic gates, and/or electrical circuits such as application-specific integrated circuits (ASICs), field-programmable gate arrays (FPGAs), digital signal processors (DSPs), and/or other dedicated or shared processors now known or later developed. Such components may also be provided using firmware, software, and/or a combination of hardware, firmware, and/or software.

The operations, methods, and processes disclosed herein may be embodied as code and/or data, which may be stored on a non-transitory computer-readable storage medium for use by a computer system. The computer-readable storage medium may correspond to volatile memory, non-volatile memory, hard disk drives (HDDs), solid-state drives (SSDs), hybrid disk drives (HDDs), magnetic tape, compact discs (CDs), digital video discs (DVDs), and/or other media capable of storing code and/or data now known or later developed. When the computer system reads and executes the code and/or data stored on the computer-readable storage medium, the computer system performs the methods and processes embodied in the code and/or data.

The disclosed embodiments relate to a gimbal system that allows a payload to be orientated in any attitude without mechanical limits, interference between the payload and gimbal structure, or gimbal lock. This is accomplished with a four-axis gimbal system and control system, which allow for unlimited range of motion in all rotational degrees of freedom. The control system is further augmented with inertial stabilization to allow a payload to be isolated from the rotational motion of a vehicle or other object to which the gimbal structure is mounted.

Figure 1:
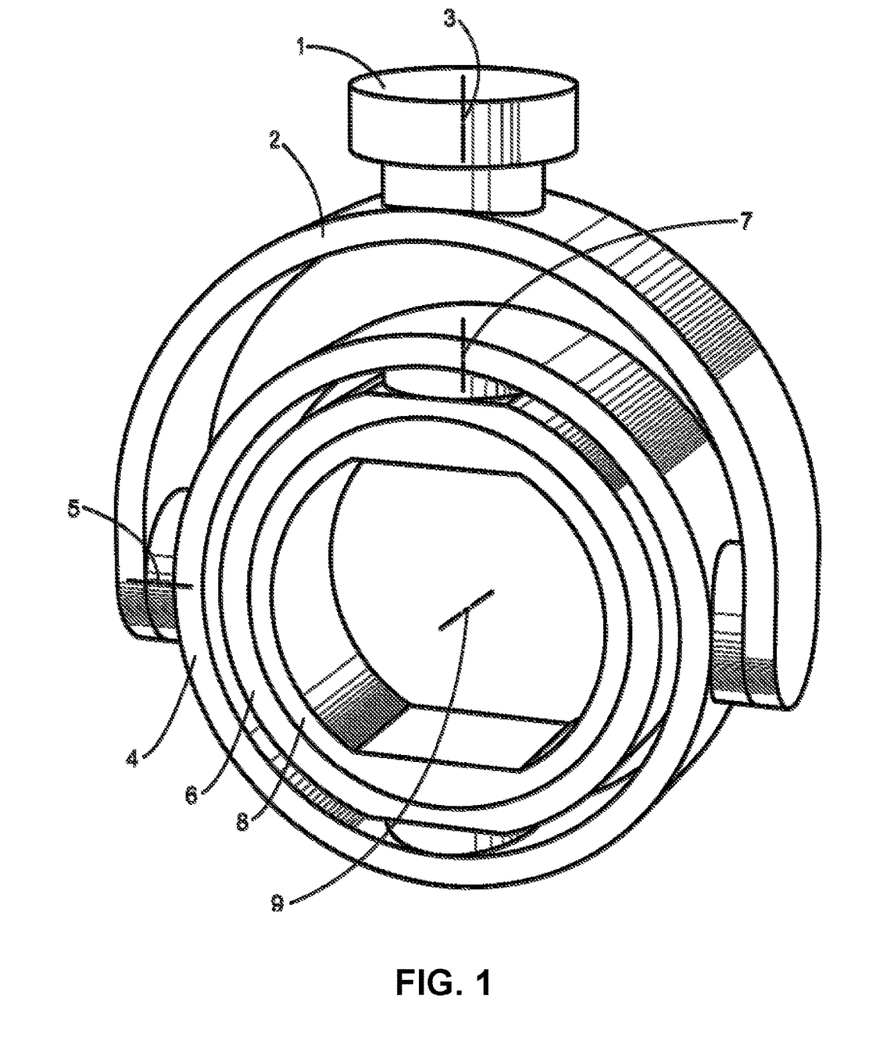
FIG. 1 shows a four-axis gimbal system in accordance with one or more embodiments.

FIG. 1 shows a four-axis gimbal system in accordance with one or more embodiments. The gimbal system includes a base 1 that is attached via a bearing to a first rotating segment 2, which rotates about an axis 3 relative to base 1. A second rotating segment 4 is attached via a bearing to the first rotating segment 2 and rotates about an axis 5 relative to the first rotating segment 2. A third rotating segment 6 is attached via a bearing to the second rotating segment 4 and rotates about an axis 7. A fourth and final rotating segment 8 is attached via a bearing to the third rotating segment 6 and rotates about an axis 9. A payload may be attached to the final rotating segment 8.

Base 1 may be attached to a moving ground, sea or air vehicle, jib, suspension cables or other platform. Rotating segments 2, 4, 6, and 8 may be made of metal, composite or other materials and connected by rotating joints. A means to convey signal across each rotating joint may be fitted. Continuous rotation on axes 3, 5 and 9 may allow unrestricted rotational motion and stabilization of the payload. For example, slip rings, rotary joints, and/or other mechanisms that allow unlimited rotation of joints attached to one or more axes 3, 5, 7 and 9 may be used to enable rotation of the gimbal system in every degree of freedom without limit. Such slip rings, rotary joints, and/or other mechanisms may convey power, control, feedback, sensor and video signals in both directions.

A particular geometry of axes 3, 5, 7, and 9 may enable the payload to be placed in any orientation, independently of the orientation of base 1. First, axis 5 may always be perpendicular to axis 3. Second, axis 7 may always be perpendicular to axis 5. Third, axis 9 may always be perpendicular to axis 7.

Control authority over all three rotational degrees of freedom of the payload's line-of-sight is always possible. In the configuration shown in FIG. 1, the payload may be "yawed" by moving either axis 3 or axis 7. The payload may be "pitched" by moving axis 5. The payload may be "rolled" by moving axis 9. In the configuration shown in FIG. 4D, the payload can be "yawed" by moving axis 5, "pitched" by moving axis 7 and "rolled" by moving either axis 3 or axis 9.

Each of the gimbal axes 3, 5, 7 and 9 is fitted with a motor (or other actuator) and encoder (or resolver or other angular feedback device) for active control of the gimbal system. The particular embodiment in FIG. 1 makes use of a large-diameter motor, slip ring, and encoder for axis 9, but other design variations are possible that maintain the same fundamental gimbal geometry and properties. For example, axis 9 may use a cantilevered motor, slip ring, and/or encoder of much smaller diameter. In another example, axis 9 may use a cantilevered small-diameter slip ring and encoder and a large-diameter motor.

To achieve unlimited range of motion in every circumstance, the gimbal system may be made to rotate continuously on three of the four axes. In the embodiment shown in FIG. 1, axis 3, axis 5 and axis 9 rotate continuously while axis 7 requires only limited rotation. The continuous-rotation axes 3, 5 and 7 may be fitted with slip-rings or rotary joints to convey signal or power through the gimbal system, the other axes (e.g., axis 7), and to the payload.

A "gimbal lock" problem may occur if axes 3, 5, 7 and 9 are aligned in the same plane such that control authority was lost in one dimension. For example, such a configuration would occur if, referring to the configuration of FIG. 1, segment 6 were rotated about axis 7 until axis 9 is aligned with axis 5. In this configuration, there is no way to roll the payload. Thus, the gimbal system is capable of getting in to a configuration that results in "gimbal lock." This particular gimbal configuration may also be undesirable because the payload is now pointed into the gimbal structure, which obscures the line-of-sight of the payload. Consequently, two problems (obscuration by gimbal structure and gimbal lock) may result from the same gimbal configuration.

In one or more embodiments, the gimbal system of FIG. 1 is operated using a control system that actively works to avoid configurations that result in gimbal lock and/or blocking of the payload's line-of-sight while still pointing the payload in the desired direction. Those skilled in the art will appreciate that other four-axis gimbal geometries are possible, and that a similar control scheme may be used to prevent gimbal lock and obscuring of the payload's line-of-sight with such geometries. For example, the control systems described below may be used to control the gimbal system in which axis 7 includes a large-diameter hollow mechanism and axis 9 has a limited rotation. Similarly, the control systems may be used with gimbal systems that include additional axes of rotation fitted within or outside axes 3, 5, 7, and/or 9, resulting in five or more total axes of rotation.

Figure 2A:
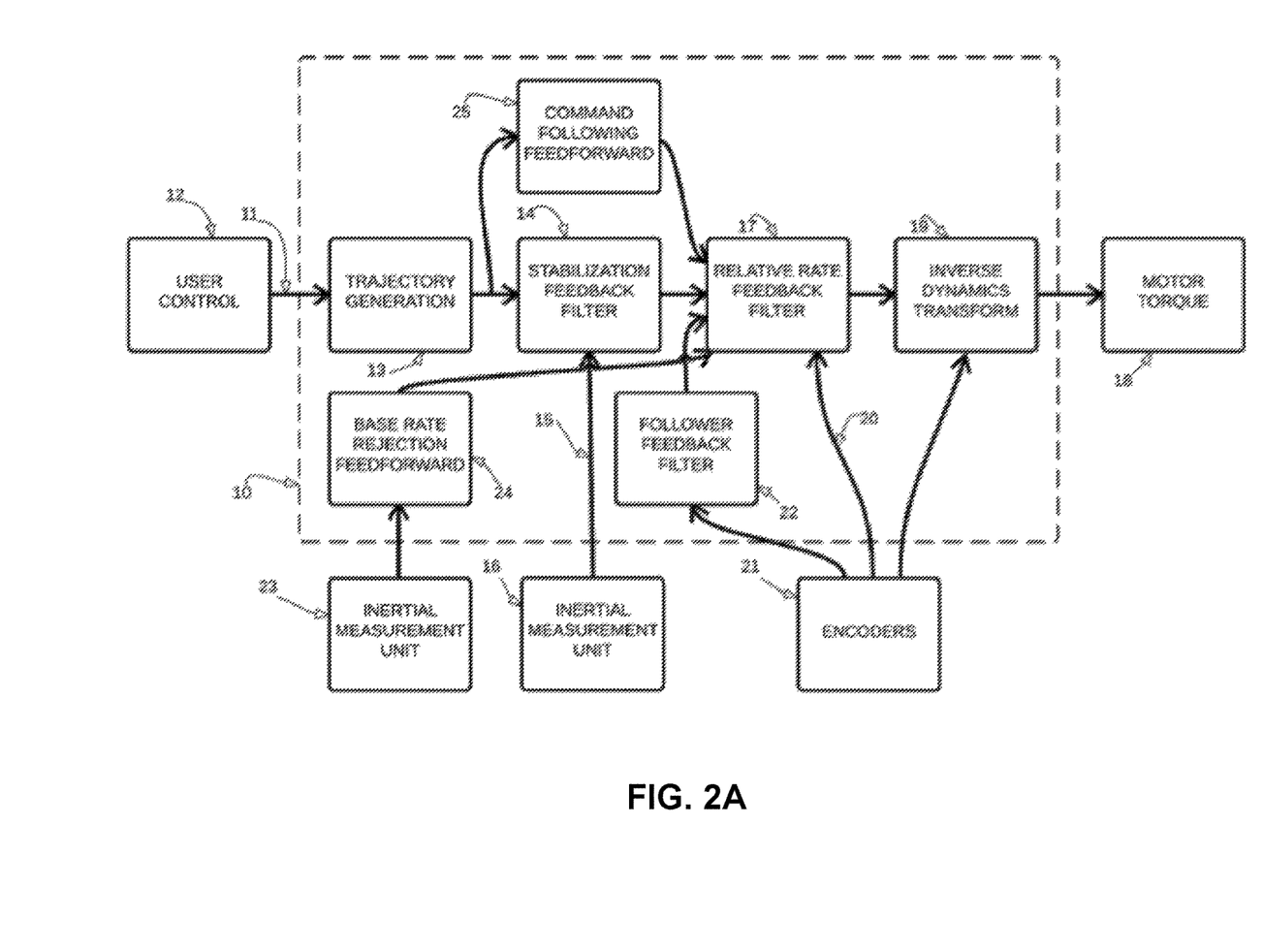
FIG. 2A shows a control system for a gimbal system in accordance with one or more embodiments.

An exemplary control system for the four-axis gimbal system of FIG. 1 is shown in FIG. 2A. In particular, FIG. 2A includes a control system 10 that receives command input signals 11 from a user control 12 through a device such as a joystick controller, control console, and/or another computer. Command input signals 11 may provide the desired motion of a camera or other payload disposed within the gimbal system in any of several possible coordinate systems, including, but not limited to, line-of-sight inertial rates, absolute Earth relative positions, and/or horizon-relative angular rates.

A trajectory generation block 13 may smooth command input signals 11 and provide inertial rate commands to a stabilization feedback filter 14. More specifically, trajectory generation block 13 may take payload motion commands in a user-provided coordinate system (e.g., from user control 12) and convert them into an inertial stabilization coordinate system. In the most basic user control mode, three inertial angular rates may be passed unmodified to stabilization feedback filter 14. In more complex modes, the gimbal system may be commanded in Earth-relative or point-of-view modes that require different transformations to generate the desired behavior for the stabilization rate commands.

Stabilization feedback filter 14 may also use feedback in the form of inertial rates 15 sensed by gyroscopes, accelerometers, and/or other inertial sensors in an inertial measurement unit 16 on the gimbal system. Inertial rates 15 may be used as feedback, and the commanded stabilization rates may be used as the command for a feedback loop or feedback filter in stabilization feedback filter 14. A proportional-integral-derivative (PID) controller may be used within stabilization feedback filter 14 to provide stabilization to the gimbal system. Advanced features such as limiting, notch filters, high-order filters, feedforward, etc. may also be added for additional performance.

In one or more embodiments, stabilization feedback filter 14 includes three independent PID-type feedback controllers, one for each feedback axis. Note that if the gimbal system is not made to be stabilized, stabilization feedback filter 14 may be omitted altogether, and trajectory generation block 13 may provide commands to relative rate feedback filter 17 directly.

Inertial measurement unit 16 may provide inertial angular rate measurements for stabilization by stabilization feedback filter 14. Inertial measurement unit 16 may be replaced by gyroscopic sensing of inertial angular rates in all three feedback axes. Fewer than three axes of gyroscopic sensing may interfere with full feedback stabilization in all degrees of rotational freedom, while only two axes of inertial sensing may be required in applications in which roll stabilization is not required.

Relative rate feedback filter 17 may generate motor torque 18 commands to a number of motors coupled to the gimbal axes 3, 5, 7 and 9 through an inverse dynamics transform 19. Relative rate feedback filter 17 may use a PID-type controller with additional features such as limiting, notch filters, etc. Relative rate feedback filter 17 may use feedback in the form of angular measurements or angular rate measurements 20 from encoders 21 that include angular sensors and/or angular rate sensors such as tachometers.

In one or more embodiments, relative rate feedback filter 17 is composed of four independent PID-type feedback controllers that use relative (not inertial) angle or angular rate feedback. Such relative angular rate measurements 20 may be provided by encoders 21, resolvers and/or similar devices. For example, encoders 21 may use optical sensors and rotating disks mounted on axes 3, 5, 7 and 9 to measure the rotational positions of axes 3, 5, 7 and 9 and provide the rotational positions as relative angular rate measurements 20. The four PID-type feedback controllers of relative rate feedback filter 17 may then be commanded by summing the various input commands going into relative rate feedback filter 17: stabilization feedback filter 14 output, a follower feedback filter 22 output, base rate rejection feedforward 24 and command following feedforward 25. Each of these features or input command sources may be enabled or disabled individually.

An inverse dynamics transform 19 may compute the required motor torque 18 to achieve gimbal axis (e.g., axes 3, 5, 7, and 9) angular accelerations. This may be accomplished by inverting the forward rigid body dynamics of the gimbal system. Note that these dynamics may vary with gimbal configuration and so depend on the various gimbal angles. Thus, the current gimbal angles as reported by encoders 21 or resolvers may be used in this transform. The full inverse dynamics may be simplified using small-angle trigonometric approximations, look-up tables, gain scheduling, and/or other techniques used to speed computer processing.

Follower feedback filter 22 may use the position of a limited-angle axis, such as axis 7 in FIG. 1, as feedback to a PID-type controller with additional features such as limiting, notch filters, etc., to command a relative rate to a redundant axis, such as axis 3 in FIG. 1, so that the limited-angle axis remains in the center of its travel. Follower feedback filter 22 may prevent the gimbal system from approaching gimbal lock and the line-of-sight of the payload from being obscured by the gimbal structure. This may be achieved with a feedback loop that has an unchanging command to "center" the limited-angle gimbal axis. During such "centering," the relative angle formed by two rotating segments along the axis may be driven from a non-zero value to a zero value, as described in further detail below with respect to FIGS. 4A-4B. Advanced gain sloping, scheduling, or other techniques may also be used to tune the behavior of follower feedback filter 22.

An additional inertial measurement unit 23 may be fitted to base 1 and used to improve stabilization performance using a base rate rejection feedforward 24 mapping. In particular, the angular rate outputs from inertial measurement unit 23 may be used in base rate rejection feedforward 24 mapping to help remove angular motion of base 1. Base rate rejection feedforward 24 block may include a kinematics transform that computes relative angular rates of the gimbal system to cancel angular rates of base 1. Inertial measurement unit 23 may be a device such as vertical gyroscope or attitude reference system with similar outputs, or inertial measurement unit 23 may be implemented with gyroscopic and attitude sensors.

If no feedback gyroscope or inertial measurement unit 16 is present, a command following feedforward block 25 may be used to control system 10. Command following feedforward block 25 may compute gimbal angle relative rates to achieve the desired inertial rates, under the assumption that base 1 is not moving. If the feedback gyroscope or inertial measurement unit 16 is present and stabilization feedback filter 14 is used, command following feedforward block 25 may optionally be used to improve control performance. One advantage of the control scheme in FIG. 2A is that it allows the individual control elements to be designed and tested separately, with all elements providing input to relative rate feedback filter 17.

Figure 2B:
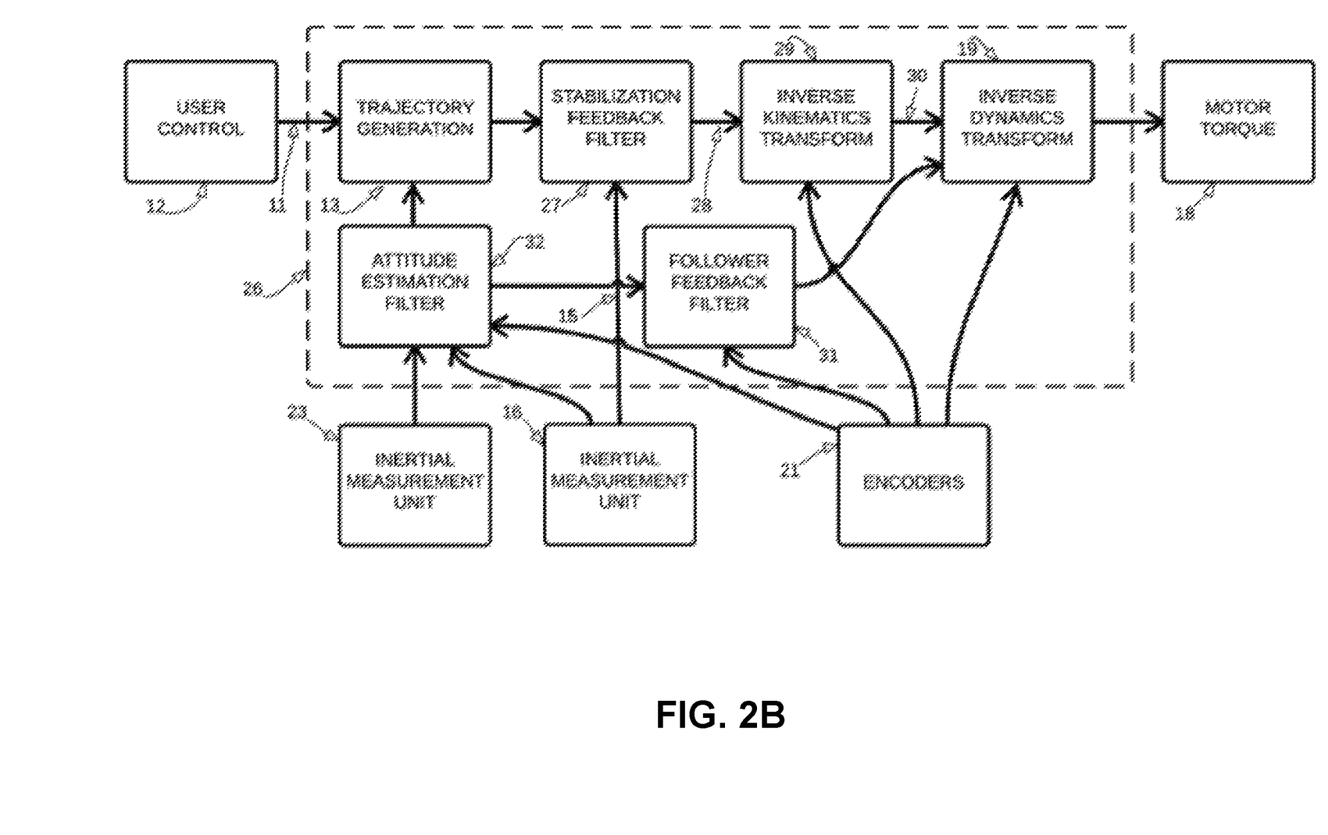
FIG. 2B shows a control system for a gimbal system in accordance with one or more embodiments.

FIG. 2B shows an alternative control system 26 that achieves substantially the same result as control system 10 of FIG. 2A: control over an unlimited field of regard of a payload disposed within the gimbal system. Control system 26 uses the same input signals 11 from user control 12, physical sensors including inertial measurement units 23 and 16 and encoders 21, and the same motor torque 18 structure. The operation of trajectory generation 13 is similar and accommodates similar user control modes.

In control system 26 of FIG. 2B, relative rate feedback filter 17 may be omitted. A modified stabilization feedback filter 27 generates a number of commands 28 to an inverse kinematics transform block 29. Commands 28 may be in the form of angular accelerations in the stabilization coordinate frame. For example, stabilization feedback filter 27 may include three independent PID-type feedback control loops. Each loop may use measured inertial rates from inertial measurement unit 16 to achieve the desired inertial rates as computed by trajectory generation block 13. The outputs of these control loops may include commands 28 containing angular accelerations in inertial space.

Inverse kinematics transform 29 may transform commands 28 to angular accelerations 30 along the gimbal axes 3, 5, 7, and 9. More specifically, inverse kinematics transform 29 may convert angular accelerations from inertial space to gimbal axis angular accelerations 30. This may be accomplished by inverting the kinematic relationships, which depend on the current gimbal angles. Thus, the gimbal angles reported by encoders 21 or similar devices may be used to compute this transform. As before, inverse dynamics transform 19 may correctly account for the gimbal rigid body dynamics and motor dynamics to command motor torque 18 on the gimbal system.

A modified follower feedback filter 31 may ensure that the "following" axis moves to achieve the effect of avoiding gimbal lock and obscuration of the payload's line-of-sight by the gimbal system. In particular, follower feedback filter 31 may command the outer gimbal to avoid the gimbal lock position. To do so, follower feedback filter 13 may use a PID-type control loop based on feedback from encoders 21 to keep the appropriate gimbal axis centered, such that the relative angle across the axis is driven to zero. Follower feedback filter 31 may also serve to precisely position the payload using input from a payload attitude estimation filter 32.

Attitude estimation filter 32 may use various inputs from the physical sensors to produce an estimate of the attitude of the payload. For example, attitude estimation filter 32 may use inertial sensing, including accelerometers or other attitude sensors that are mounted to either the gimbal system or base 1. Attitude estimation filter 32 may also use Global Positioning System (GPS) data, inertial navigation output or a vertical gyroscope-type sensor. This can be used in some control modes in trajectory generator 13. The attitude estimate may also include absolute position feedback to position loops in the follower feedback filter 31 to ensure proper pointing of the payload. Attitude estimation filter 32 may also be added to control system 10 of FIG. 2A in a similar fashion. In turn, output from attitude estimation filter 32 may be used to point the payload relative to a coordinate system such as Earth, estimate a horizon and control roll of the payload relative to the horizon, and/or perform other positioning or orientation of the payload.

Those skilled in the art will appreciate that the control systems of FIG. 2A-2B may be implemented in a variety of ways. For example, one or both control systems may be provided by a combination of components, including an embedded controller, microprocessor, computer system, field-programmable gate array (FPGA), application-specific integrated circuit (ASIC), digital circuit, analog circuit, and/or one or more software modules. The control system(s) may additionally, or alternatively, execute on a dedicated processor mounted anywhere within the gimbal structure, a remote processing or computer system, and/or a processing system that is integrated with the payload. The control system(s) may also be fitted with a variety of safety and diagnostic features, including, but not limited to, fault detection, graphical orientation representations, and/or bode plot visualization for tuning and auto-tuning. The control system (s) may further be fitted with a variety of features for command input, including, but not limited to: image-based tracking; geo-pointing at fixed coordinates; geo-pointing at coordinates that are moving and reported by a moving target; radio, infrared or light beacon tracking; joystick rate control input; pointing slaved to another device; wheel input devices; and/or motion capture input devices.

Figure 3:
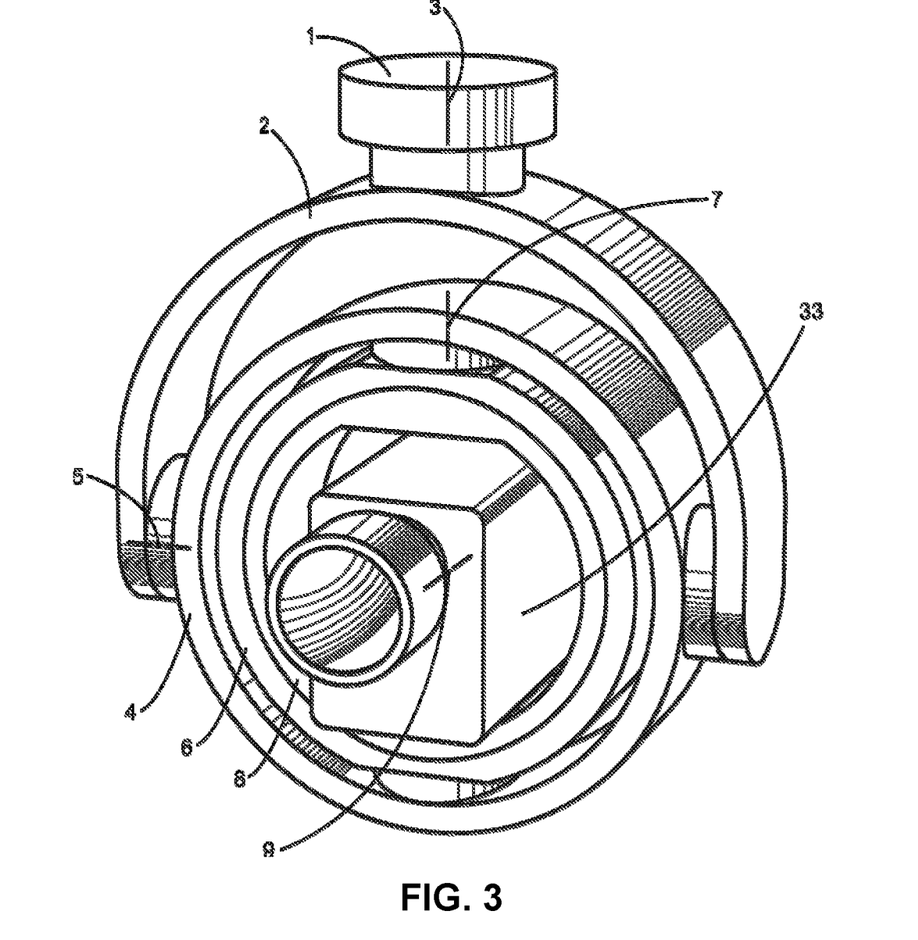
FIG. 3 shows a gimbal system with a camera mounted to the final axis in accordance with one or more embodiments.

FIG. 3 shows the gimbal system of FIG. 1 with a camera 33 mounted to the final axis 9 in accordance with one or more embodiments. As mentioned above, axis 9 may include a large-diameter hollow mechanism, which may allow a payload represented by camera 33 to be positioned in the center of axis 9. The orientation of camera 33 may be controlled without limitation by the gimbal system and a control system, such as control systems 10 and 26 of FIGS. 2A-2B.

Figure 4A:
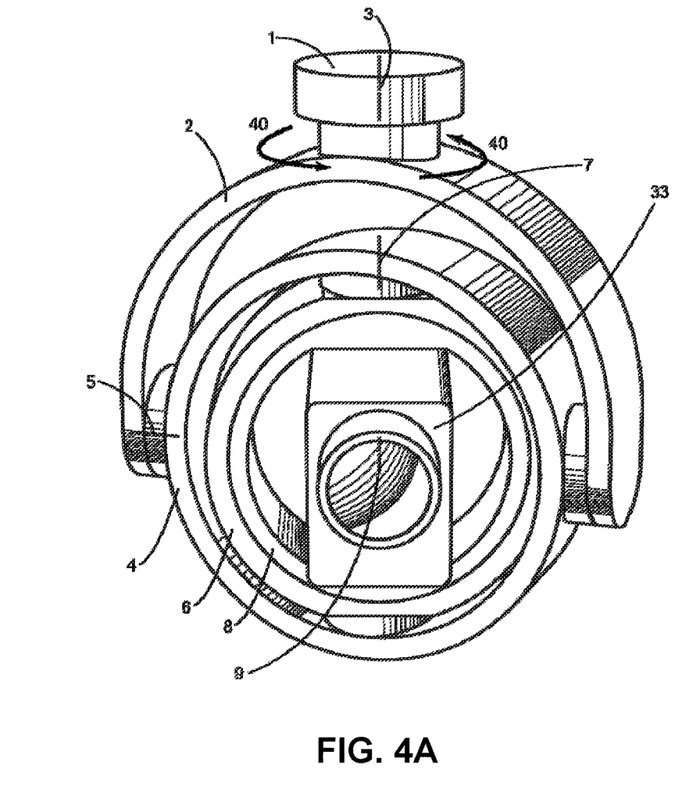
FIG. 4A shows the configuration of a gimbal system with a camera mounted to the final axis in accordance with one or more embodiments.
Figure 4B:
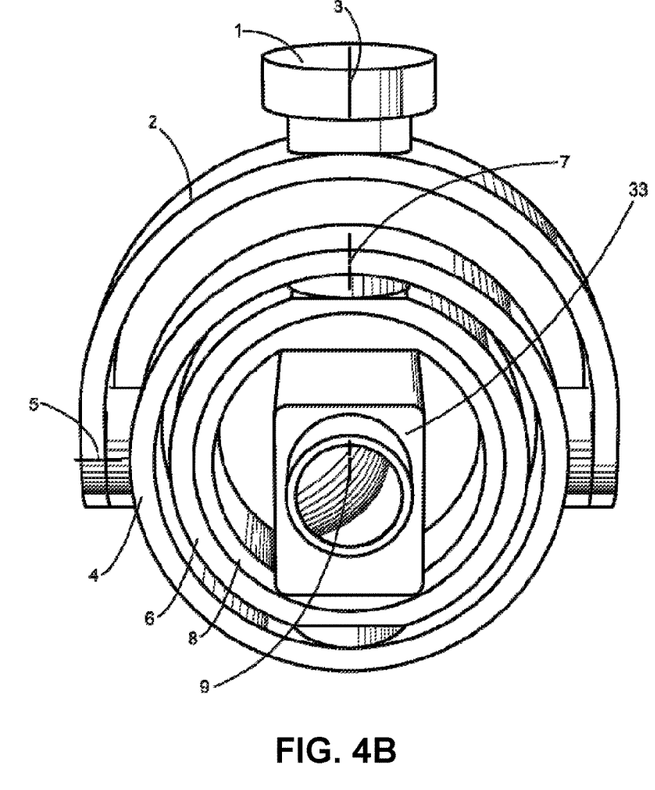
FIG. 4B shows the configuration of a gimbal system with a camera mounted to the final axis in accordance with one or more embodiments.
Figure 4C:
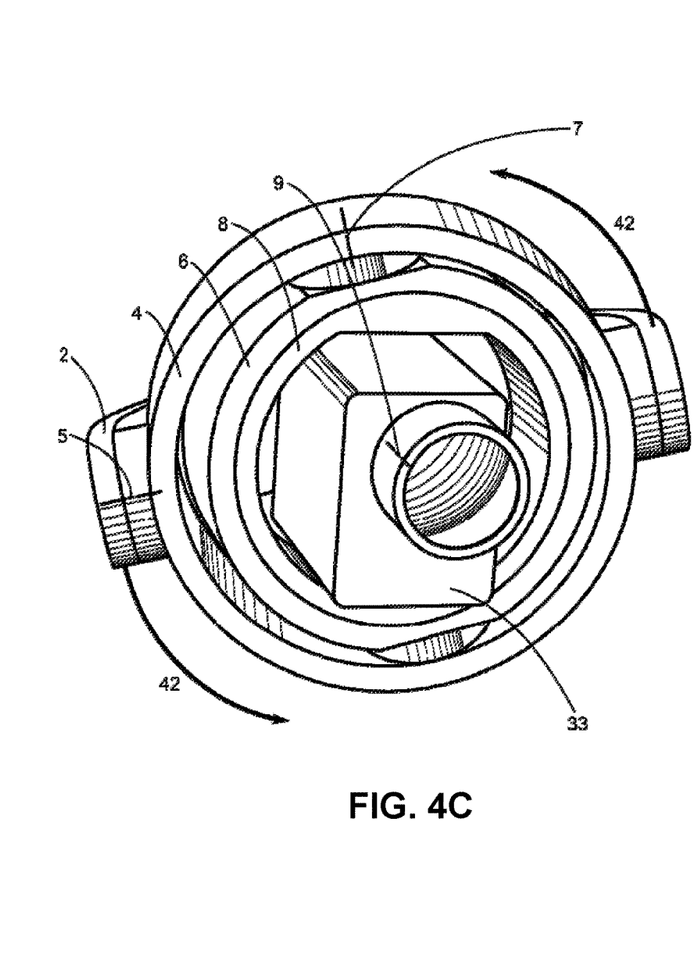
FIG. 4C shows the configuration of a gimbal system with a camera mounted to the final axis in accordance with one or more embodiments.
Figure 4D:
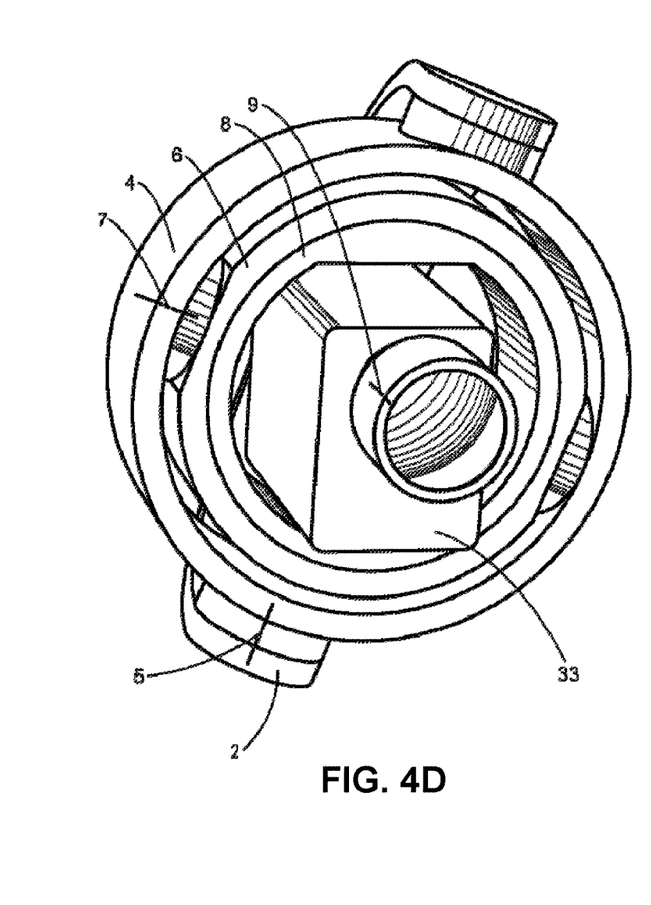
FIG. 4D shows the configuration of a gimbal system with a camera mounted to the final axis in accordance with one or more embodiments.

The action of the control system and corresponding follower feedback filter (e.g., follower feedback filters 22 and 31) in positioning camera 33 is shown in FIGS. 4A-4D. In FIG. 4A, continued turning of axis 7 so that camera 33 points to the right will cause the gimbal structure to enter the field-of-view of camera 33 and the gimbal system to enter a gimbal lock position. The control system may measure the angles of axes 3, 5, 7, and 9 using encoders 21 and move axis 3 in a counterclockwise direction 40 to avoid this condition while counter-moving the other axes 5, 7, and 9 to maintain camera 33 in the same orientation and line-of-sight, resulting in the configuration shown in FIG. 4B. In other words, the control system may cancel out the torque on an inner axis 7 of the gimbal system by commanding a counteracting torque on an outer axis 3. Thus, a non-zero relative angle across axis 7 (i.e., the angle between segments 4 and 6) in FIG. 4A may be driven to a zero relative angle in FIG. 4B by rotating axis 3 and making counter-rotations with the remaining axes 5, 7, and 9 to hold the payload in the same position. Such reaction torque cancellation may be performed immediately without waiting for feedback from encoders 21 and/or inertial measurement unit 16 to improve the performance of the gimbal system.

Similarly, in FIG. 4C, continued turning of axis 7 in a counterclockwise direction may cause the field of view of camera 33 to be obscured by the gimbal structure. To prevent such obscuration, the follower feedback filter and entire control system may move all axes 3, 5, 7 and 9, including rotating axis 3 in a direction 42 that counteracts the rotation of axis 7, such that axis 7 is re-centered (i.e., the angle between segments 4 and 6 is zero) and camera 33 maintains stable orientation and line-of-sight, resulting in the configuration shown in FIG. 4D.

Figure 5A:
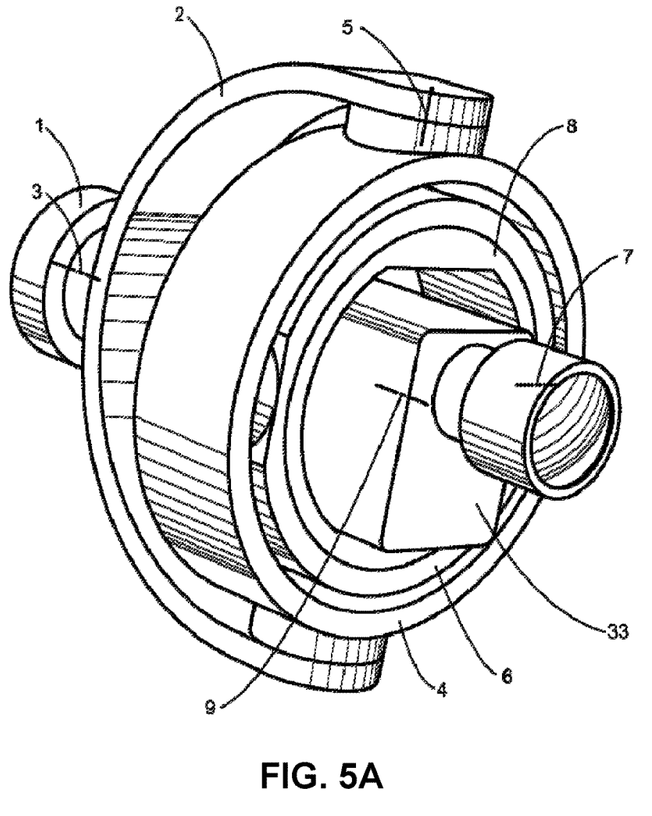
FIG. 5A shows the configuration of a gimbal system with a camera mounted to the final axis in accordance with one or more embodiments.
Figure 5B:
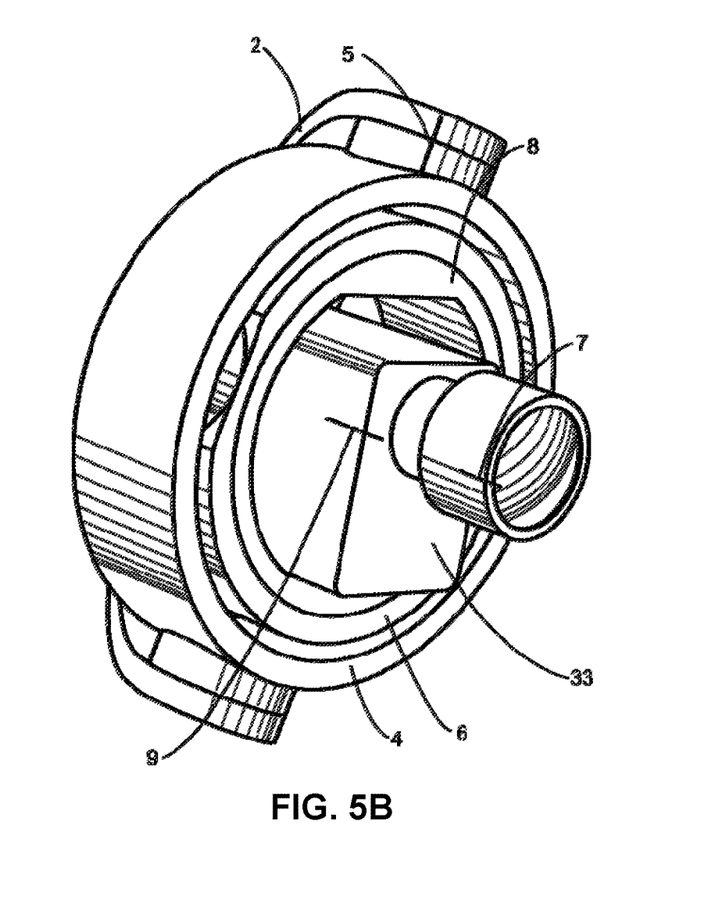
FIG. 5B shows the configuration of a gimbal system with a camera mounted to the final axis in accordance with one or more embodiments.
Figure 5C:
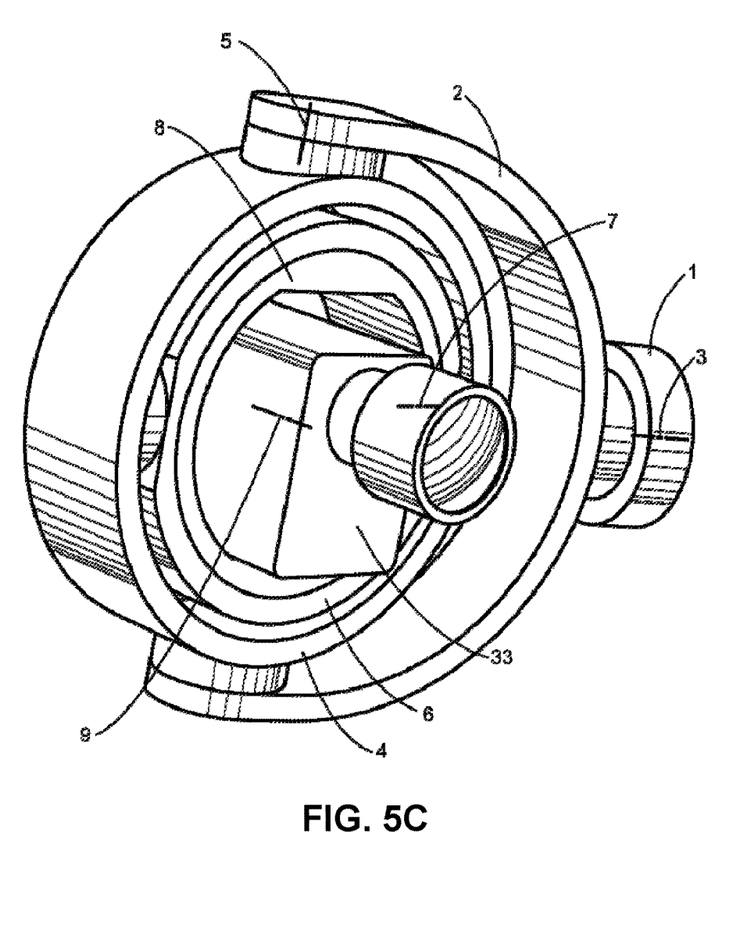
FIG. 5C shows the configuration of a gimbal system with a camera mounted to the final axis in accordance with one or more embodiments.

Base 1 may be oriented in any attitude and may change attitude arbitrarily as the gimbal system and control system continue to stabilize the line of sight, as shown in FIGS. 5A-5C. In FIGS. 5A-5C, the control system may generate commands to motors 18 to move axes 3, 5, 7 and 9, achieve unlimited control of camera 33, and maintain the orientation and line-of-sight of camera 33 as base 1 rotates from behind camera 33 to in front of axis 5 (e.g., to isolate camera 33 from the rotational motion of a vehicle to which base 1 is mounted).

Those skilled in the art will appreciate that the gimbal system and corresponding control system may be implemented or controlled in various ways. First, the gimbal system may be controlled from a remote location through a cable or through a wireless link. Wireless links may also be used to convey encoder feedback, gimbal control systems, inertial feedback, motor commands or payload data back and forth, in place of slip rings or other mechanisms. Motors used to actuate the gimbal axes may include direct drive motors, a variety of geared or belt-driven mechanisms, piezo actuators, hydraulic actuators, and/or other types of actuation mechanisms or systems.

Second, the gimbal structure may be fitted with passive shock or vibration isolators between the base and the first axis (e.g., axis 3), between any axes, or between the payload and the gimbal structure. The gimbal structure may additionally be fitted with actively controlled translation axes to provide some translational motion control.

Although the axes of the illustrated gimbal structure intersect at one point, other embodiments may have non-intersecting axes, such as one or more axes that are offset from other axes in the gimbal system. Similarly, although the subsequent axes (e.g., axes 5, 7, 9) of the gimbal structure are perpendicular to one another, other embodiments may have geometries with subsequent axes that are not perpendicular to one another.

The gimbal system may also be fitted with various features for achieving balance. The gimbal system may further be fitted with various features for allowing the quick modification of the gimbal system to better accommodate payloads of various sizes, such as extendable pieces to increase the distance between axes 3 and 5.

The gimbal system may be fitted with features for quick-releasing the gimbal structure from a variety of mounts for various vehicles, objects, bases, human body or hand use. The gimbal system may also be fitted with various features for quick-releasing the payload.

The gimbal system may be fitted with various features to allow the rapid reconfiguration between the various embodiments discussed here. Examples include externally mounted quickly removable slip rings, rotary joints, quick release mounts for wireless transmitters and quick release, quick disconnect inertial sensors for stabilized and/or non-stabilized applications.

The gimbal structure may be built with a variety of materials and components, including, but not limited to, metals, plastics, carbon fiber, graphite, and/or composite materials. The gimbal design may allow for internal wiring and internal mounting of electronic components for sensing, control and processing.

The gimbal structure may be fitted with a coudé path across one or more axes. The gimbal structure may further be fitted with safety features such as brakes, stow pins, hard stops on limited rotation axes, emergency or disable switches and handling features such as handles and grips.

Figure 6:
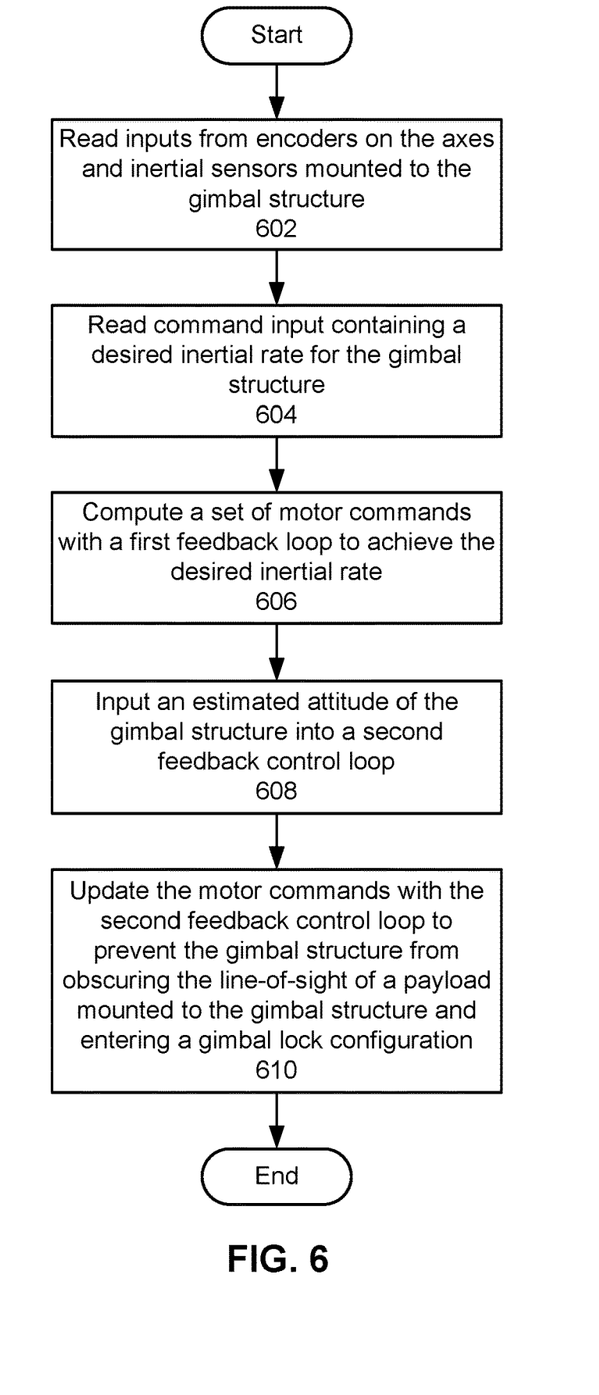
FIG. 6 shows a flowchart illustrating the process of operating a gimbal structure with four or more axes in accordance with one or more embodiments.

FIG. 6 shows a flowchart illustrating the process of operating a gimbal structure with four or more axes in accordance with one or more embodiments. In one or more embodiments, one or more of the steps may be omitted, repeated, and/or performed in a different order. Accordingly, the specific arrangement of steps shown in FIG. 6 should not be construed as limiting the scope of the embodiments.

Initially, inputs are read from a set of encoders on the axes and a set of inertial sensors mounted to the gimbal structure (operation 602). The inputs may include relative angular rate measurements from the encoders and/or inertial rate measurements from the inertial sensors. Command input containing a desired inertial rate for the gimbal structure is also read (operation 604). For example, the command input may be provided through a joystick controller, control console, computer system, electronic device, and/or other device.

Next, a first feedback loop is used to compute a set of motor commands to achieve the desired inertial rate (operation 606). For example, the motor commands may be calculated using one or more PID-type feedback controllers that use inertial and/or relative angular rates to provide stabilization to the gimbal system and/or cancel angular base rates of the gimbal structure's base. An inverse dynamics transform may also be applied to the relative angular rate measurements to produce motor torques for achieving angular accelerations of the axes.

An estimated attitude of the gimbal structure is then inputted into a second feedback control loop (operation 608), and the motor commands are updated with the second feedback control loop to prevent the gimbal structure from obscuring the line-of-sight of a payload mounted to the gimbal structure and from entering a gimbal lock configuration (operation 610). For example, the attitude may be estimated using input from accelerometers, gyroscopes, attitude sensors, GPS receivers, and/or other physical or inertial sensors. The attitude estimate may also include absolute position feedback to ensure proper pointing of the payload. In turn, the attitude estimate may be provided to the second feedback control loop to "center" one or more axes in the gimbal structure so that the gimbal structure does not obscure the payload's line-of-sight and avoids a gimbal lock configuration.

Figure 7:
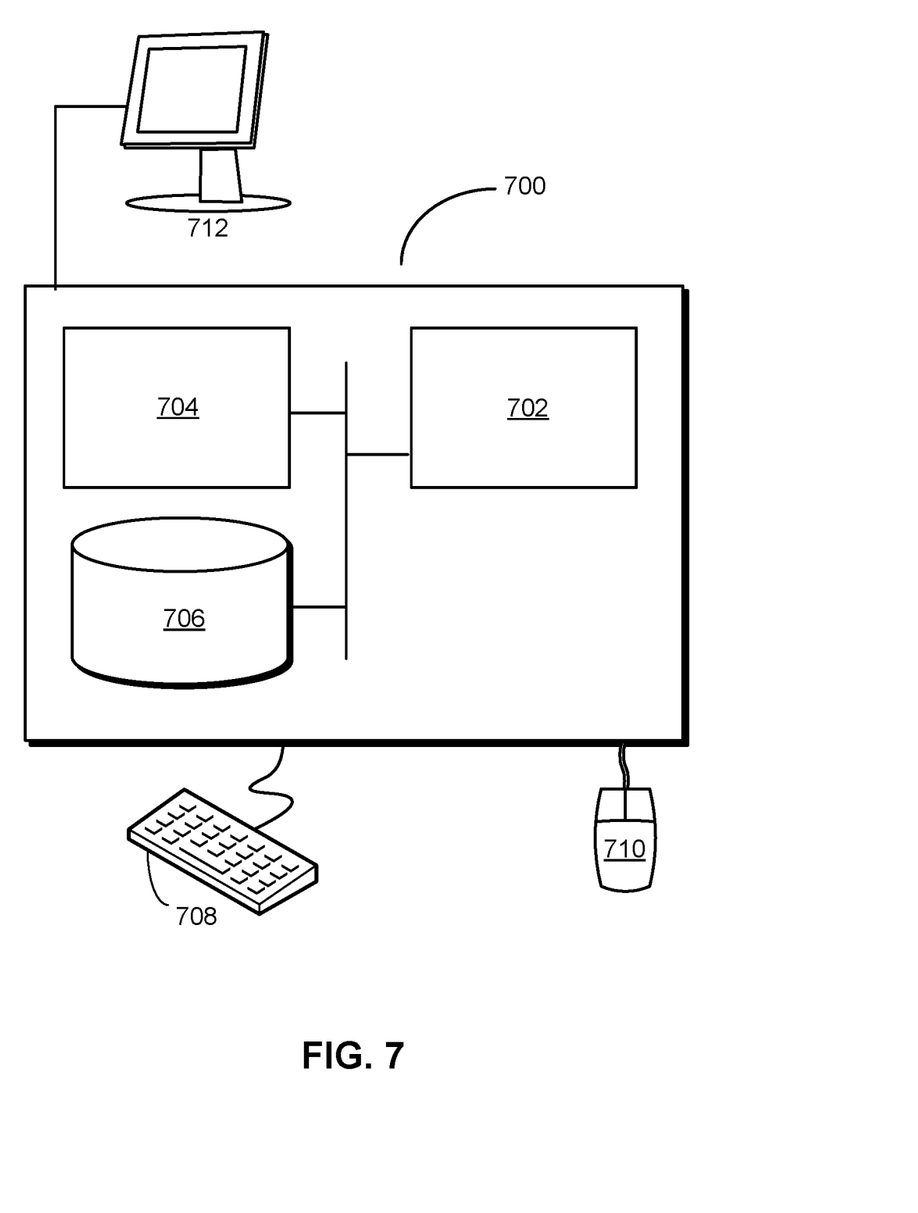
FIG. 7 shows a computer system in accordance with one or more embodiments.

FIG. 7 shows a computer system 700 in accordance with one or more embodiments. Computer system 700 includes a processor 702, memory 704, storage 706, and/or other components found in electronic computing devices. Processor 702 may support parallel processing and/or multi-threaded operation with other processors in computer system 700. Computer system 700 may also include input/output (I/O) devices such as a keyboard 708, a mouse 710, and a display 712.

Computer system 700 may include functionality to execute various components of the present embodiments. In particular, computer system 700 may include an operating system (not shown) that coordinates the use of hardware and software resources on computer system 700, as well as one or more applications that perform specialized tasks for the user. To perform tasks for the user, applications may obtain the use of hardware resources on computer system 700 from the operating system, as well as interact with the user through a hardware and/or software framework provided by the operating system.

In one or more embodiments, computer system 700 provides a system for operating a gimbal structure with four or more axes. The system may include a control system that controls the gimbal structure to provide unrestricted orientation and rotational motion of a payload mounted to an axis in the four or more axes, independently of an orientation of a base of the gimbal structure. More specifically, the control system may read inputs from a set of encoders on the four or more axes and a set of inertial sensors mounted to the gimbal structure. Next, the control system may read command input containing a desired inertial rate for the gimbal structure. The control system may then compute a set of motor commands with a first feedback control loop to achieve the desired inertial rate. Finally, the control system may update the motor commands with a second feedback control loop to prevent the gimbal structure from obscuring a line-of-sight of a payload mounted to the gimbal structure and from entering a gimbal lock configuration.

In addition, one or more components of computer system 700 may be remotely located and connected to the other components over a network. Portions of the present embodiments (e.g., payload, gimbal structure, control system, sensors, etc.) may also be located on different nodes of a distributed system that implements the embodiments. For example, the present embodiments may be implemented using a cloud computing system that processes inputs from encoders and/or inertial sensors mounted to a remote gimbal structure and outputs motor commands to achieve a desired inertial rate and prevent the gimbal structure from obscuring the payload's line-of-sight and entering a gimbal lock configuration.

Although the disclosed embodiments have been described with respect to a limited number of embodiments, those skilled in the art, having benefit of this disclosure, will appreciate that many modifications and changes may be made without departing from the spirit and scope of the disclosed embodiments. Accordingly, the above disclosure is to be regarded in an illustrative rather than a restrictive sense. The scope of the embodiments is defined by the appended claims

What is claimed is:
1. A gimbal system, comprising:
a gimbal structure with four or more axes; and
a control system comprising:
one or more processors; and
memory storing instructions that, when executed by the one or more processors, cause the control system to:
read inputs from a set of encoders on the four or more axes and a set of inertial sensors mounted to the gimbal structure;
read command input comprising a desired inertial rate for the gimbal structure;
compute a set of motor commands with a first feedback control loop to achieve the desired inertial rate; and
update the set of motor commands with a second feedback control loop to prevent the gimbal structure from:
obscuring a line-of-sight of a payload mounted to the gimbal structure; and
entering a gimbal lock configuration.

2. The gimbal system of claim 1, further comprising:
a rotating joint fitted to one or more axes of the gimbal system.

3. The gimbal system of claim 1, further comprising:
one or more inertial sensors that provide inertial angular rate measurements for stabilization of the payload by the gimbal structure and the control system.

4. The gimbal system of claim 3, wherein the memory further stores instructions that, when executed by the one or more processors, cause the control system to:
use the inertial angular rate measurements to estimate a horizon and control a roll of the payload relative to the horizon.

5. The gimbal system of claim 3, wherein the memory further stores instructions that, when executed by the one or more processors, cause the control system to:
use the inertial angular rate measurements to estimate the attitude of the payload and point the payload relative to a coordinate system.

6. The gimbal system of claim 1, wherein the payload comprises a camera.

7. The gimbal system of claim 1, wherein the four or more axes comprise:
a first axis;
a second axis that is perpendicular to the first axis;
a third axis that is perpendicular to the second axis; and
a fourth axis that is perpendicular to the third axis.

8. The gimbal system of claim 7,
wherein the fourth axis comprises a large-diameter hollow mechanism within which the payload is mounted, and
wherein the third axis has limited rotation.

9. The gimbal system of claim 7,
wherein the third axis has a large-diameter hollow mechanism, and
wherein the fourth axis has limited rotation.

10. The gimbal system of claim 7, wherein the gimbal structure further comprises:
one or more additional axes of rotation fitted within or outside the first, second, third, and fourth axes of the gimbal structure.

11. The gimbal system of claim 1, wherein the control system further comprising:
a relative rate feedback filter that generates commands to one or more motors coupled to the four or more axes through an inverse dynamics transform.

12. The gimbal system of claim 1, wherein the memory further stores instructions that, when executed by the one or more processors, cause the control system to:
stabilize the gimbal system based on inertial rates from one or more inertial measurement units coupled to the gimbal system.

13. The gimbal system of claim 1, wherein the updating the set of motor commands with the second feedback control loop comprises:
centering an axis of the gimbal system to prevent the gimbal lock configuration in the gimbal system and obscuration of the line-of-sight of the payload by the gimbal system.

14. A method for controlling a gimbal structure with four or more axes, comprising:
reading inputs from a set of encoders on the four or more axes and a set of inertial sensors mounted to the gimbal structure;
reading command input comprising a desired inertial rate for the gimbal structure;
computing, by a processor, a set of motor commands with a first feedback control loop to achieve the desired inertial rate; and
updating the set of motor commands with a second feedback control loop to prevent the gimbal structure from:
obscuring a line-of-sight of a payload mounted to the gimbal structure; and
entering a gimbal lock configuration.

15. The method of claim 14, further comprising:
inputting an estimated attitude of the gimbal structure into the second feedback control loop prior to updating the set of motor commands with the second feedback control loop.

16. The method of claim 14, wherein the inputs comprise:
a relative angular rate measurement from the set of encoders; and
an inertial rate measurement from the set of inertial sensors.

17. The method of claim 16, wherein computing the set of motor commands to achieve the desired inertial rate comprises:
applying an inverse dynamics transform to the relative angular rate measurement to produce a motor torque for achieving an angular acceleration of an axis in the four or more axes.

18. A non-transitory computer-readable storage medium containing instructions embodied therein for causing a computer system to perform a method for controlling a gimbal structure with four or more axes, the method comprising:
reading inputs from a set of encoders on the four or more axes and a set of inertial sensors mounted to the gimbal structure;
reading command input comprising a desired inertial rate for the gimbal structure;
computing, by a processor, a set of motor commands with a first feedback control loop to achieve the desired inertial rate; and
updating the set of motor commands with a second feedback control loop to prevent the gimbal structure from:
obscuring a line-of-sight of a payload mounted to the gimbal structure; and
entering a gimbal lock configuration.

19. The non-transitory computer-readable storage medium of claim 18, the method further comprising:
inputting an estimated attitude of the gimbal structure into the second feedback control loop prior to updating the set of motor commands with the second feedback control loop.

* * * * *